United States Patent [19]
Sato

[11] Patent Number: 5,434,713
[45] Date of Patent: Jul. 18, 1995

[54] FISHEYE LENS HAVING A SHORT DISTANCE COMPENSATING FUNCTION

[75] Inventor: Haruo Sato, Kawasaki, Japan
[73] Assignee: Nikon Corporation, Tokyo, Japan
[21] Appl. No.: 34,416
[22] Filed: Mar. 19, 1993
[30] Foreign Application Priority Data
Mar. 26, 1992 [JP] Japan .................................. 4-068075
[51] Int. Cl.[6] .................. G02B 13/06; G02B 9/60; G02B 9/62; G02B 9/64
[52] U.S. Cl. .................................. 359/725; 359/755; 359/762; 359/770
[58] Field of Search .................. 359/725, 749–753, 359/755, 762, 770

[56] References Cited
U.S. PATENT DOCUMENTS

| | | | |
|---|---|---|---|
| 3,524,697 | 8/1970 | Isshiki et al. | 359/725 |
| 3,589,798 | 6/1971 | Ogura | 359/725 |
| 3,597,049 | 8/1971 | Ogura | 359/725 |
| 4,957,355 | 9/1990 | Sato | 359/749 |

FOREIGN PATENT DOCUMENTS 2-248910 10/1990 Japan .

Primary Examiner—Scott J. Sugarman
Attorney, Agent, or Firm—Shapiro and Shapiro

[57] ABSTRACT

A fisheye lens comprises sequentially from an object, a first lens group including a negative meniscus lens and a second lens group having positive refracting power. The first and second lens groups move on the optical axis toward the object. The fisheye lens incorporates a short distance compensating function for focusing from an infinity object point onto a short distance object point by expanding n air space between the first and second lens groups and further satisfies various conditions.

31 Claims, 3 Drawing Sheets

FISHEYE LENS HAVING A SHORT DISTANCE COMPENSATING FUNCTION

BACKGROUND OF THE INVENTION

1. Field of the Invention

The present invention relates generally to a fisheye lens having a field angle of 180° and, more particularly, to a fisheye lens that is small of fluctuation in aberration during short-distance focusing as well as being bright.

2. Related Background Art

Originally, the fisheye lens is a special lens which has been employed and developed for the scientific purpose as used for, e.g., all-sky observation photographing, etc. because of having a special projection system for projecting a semi-spherical surface on the plane.

In recent years, however, with the developments of photographs and cameras, the fisheye lens has been increasingly used not for that special projection system but for exhibiting an effect in terms of delineation due to a large negative distortion. When enhancing the effect of delineation by use of the fisheye lens especially in the field of artistic photographs, unlike the scientific-purpose usage in which the optical axis of the lens is directed to the zenith, there are required not only the optical performance for an infinity object point but also an optical performance in which the picture is uniform and excellent from the infinity object point to a short distance object point as needed in the typical wide-angle lens.

Now, supposing that the fisheye lens is simply conceived as a retrofocus type super wide-angle lens having a large distortion, it is required that a compensation thereof be done because of the performance being poor particularly at the short distance.

Seeing the recent techniques, however, for instance, Japanese Patent Application Laid-open No.2-248910 discloses no technique of compensating the fluctuations in aberration during short-distance focusing. Besides, this type of fisheye lenses in recent years has increased in its aperture ratio and has been constructed more compactly. Contrarily, those fisheye lenses have a tendency in which the fluctuation in aberration during short distance focusing rises.

Generally, the fisheye lens has a necessity for causing a large negative distortion. Hence, the basic structure is the retrofocus type having an extremely asymmetric arrangement of refracting power. Originally, in the retrofocus type lens, when focusing on the short distance object with an overall extension, a field curvature outstandingly fluctuates in a positive direction. The short distance performance worsens.

In the case of the fisheye lens, however, the remarkable negative distortion is produced with the extremely asymmetric arrangement of refracting power. Therefore, when focusing on the short distance object with the overall extension, resultantly the field curvature fluctuates strikingly in the negative direction reversely to the typical retrofocus type lens. Consequently, this also undesirably leads to worsening of the short distance performance.

The outstanding short distance fluctuations described above can be seen especially in the fisheye lens having the larger aperture ratio and that is constructed more compactly. It has been therefore desirable to develop the fisheye lens exhibiting a smaller fluctuation in the aberration at the short distance and a higher performance.

SUMMARY OF THE INVENTION

Accordingly, it is a primary object of the present invention to provide a high-performance and bright fisheye lens capable of compensating well various aberrations even at a short distance.

To accomplish this object, according to one aspect of the present invention, there is provided a fisheye lens incorporating a short distance compensating function, comprising: a first lens group including at least one negative meniscus lens, positioned closest to an object, with its convex surface toward the object and at least one positive lens; a second lens group including a cemented positive lens consisting of a positive lens and a negative lens and disposed closer to an image than the first lens group to have positive refractive power on the whole. When focusing from an infinity object point onto a short distance object point, at least the first lens group moves on the optical axis toward the object to expand an air space between the first and second lens groups. The fisheye lens is constructed to compensate an aberration especially at the short distance.

Further, on this occasion, it is desirable that moving quantities thereof be set to satisfy the following condition:

$$0 \leq X_2/X_1 \leq 0.9$$

where $X_1$: the moving quantity of the first lens group $G_1$ during focusing, and $X_2$: the moving quantity of the second lens group $G_2$ during focusing.

Still further, for compensating well particularly a spherical aberration, the first lens group is constructed so that a conversion inclination is set to satisfy the following condition:

$$-1.5 \leq \alpha \leq 1$$

where $\alpha$ is the conversion inclination obtained by multiplying an angle between the paraxial marginal ray emerging from an on-axis infinity object point that is incident on the closest-to-object lens surface of the second lens group and the optical axis by a refractive index of a medium just before this surface.

Note that the conversion inclination $\alpha$ in this case is a value obtained when the initial values are set such as $\alpha_1=0$, $h_1=f$ (the focal length of the whole lens system) in the paraxial ray tracing formula (where, $\alpha_1$: the value obtained by multiplying an angle between the paraxial ray incident on the foremost lens surface and the optical axis by the refractive index of the medium just before this surface, and $h_1$: the distance of incidence of the paraxial ray incident on the foremost lens surface).

Based on the construction described above, it is possible to provide a high-performance, bright and compact fisheye lens capable of compensating the conventionally uncompensated fluctuation in the aberration at the short distance by means of relative movements between the first and second lens groups.

Other objects, characteristics and effects of the present invention will become apparent during the following full discussion in conjunction with the accompanying drawings.

DESCRIPTION OF THE PREFERRED EMBODIMENTS

Embodiments of the present invention will hereafter be described in detail with reference to the accompanying drawings.

The present invention utilizes a characteristic of fluctuations in aberration during short-distance focusing of a fisheye lens, the characteristic being such that the aberration fluctuates in an exactly opposite direction to a fluctuating direction of a field curvature caused when extending the whole of an ordinary wide-angle lens. A short distance compensation is performed by a method different from the short distance compensation method of the typical wide-angle lens.

The fisheye lens of this invention is constructed as follows. The fisheye lens, as illustrated in FIGS. 1 through 6, comprises a first lens group $G_1$ and a second lens group $G_2$. The first lens group $G_1$ includes at least one negative meniscus lens $L_1$, positioned closest to an object, with its convex surface toward the object and at least one positive lens. The second lens group $G_2$ includes a cemented positive lens consisting of a positive lens and a negative lens. The second lens group $G_2$ is disposed closer to an image than the first lens group $G_1$ to have positive refractive power on the whole. When focusing from an infinity object point onto a short distance object point, at least the first lens group $G_1$ moves on the optical axis toward the object to expand an air space between the first and second lens groups $G_1$, $G_2$. An aberration at the short distance is thus compensated. Further, moving quantities thereof are set to satisfy the following condition:

$$0 \leq X_2/X_1 \leq 0.9 \qquad (1)$$

where $X_1$: the moving quantity of the first lens group $G_1$ during focusing, and $X_2$: the moving quantity of the second lens group $G_2$ during focusing.

Besides, the first lens group $G_1$ is constructed so that a conversion inclination $\alpha$ is set to satisfy the following condition:

$$-1.5 \leq \alpha \leq 1 \qquad (2)$$

where $\alpha$ is the value (i.e., the conversion inclination) obtained by multiplying an angle between the paraxial marginal ray emerging from an on-axis infinity object point that is incident on the closest-to-object lens surface of the second lens group $G_2$ and the optical axis by a refractive index of a medium just before this surface.

Note that the conversion inclination $\alpha$ described above is a value obtained by setting initial values in a paraxial ray tracing formula as follows:

$$\alpha_1 = 0, \; h_1 = f$$

where $\alpha_1$: the value obtained by multiplying an angle between the paraxial ray incident on the foremost lens surface and the optical axis by a refractive index of a medium just before this surface, $h_1$: the distance of incidence of the paraxial ray incident on the foremost lens surface, and $f$: the focal length of the whole lens system.

As described above, the fisheye lens of this invention has at least two lens groups, i.e., the first lens group $G_1$ and the second lens group $G_2$. The field curvature shifts in a positive direction by expanding the air space therebetween. Utilizing this characteristic, the field curvature that originally shifts in a negative direction during focusing on the short distance object point is offset by expanding the air space between the first and second lens groups $G_1$, $G_2$.

Hence, a uniform and good delineative performance can be gained at each object distance by compensating the aberration during focusing on the short distance object point, especially a decline of the field curvature.

The following is an explanation of the conditional formulae given above.

The conditional formula (1) provides a condition for setting a ratio of the moving quantity of the first lens group $G_1$ to the moving quantity of the second lens group $G_2$ when focusing from the infinity object point onto the short distance object point. If over an upper limit of the conditional formula (1), the moving quantities of the first and second lens groups $G_1$, $G_2$ become approximate to the same quantity. Further, the moving quantity of the second lens group $G_2$ gets larger than that of the first lens group $G_1$. The direction turns out to narrow the air space between the first and second lens groups $G_1$, $G_2$. For this reason, when focusing on the short distance object point, the field curvature further shifts in the negative direction. Consequently, the short distance performance gets worse. It is undesirably impossible to acquire a good image-forming performance.

Whereas if under a lower limit of the conditional formula (1), the first and second lens groups $G_1$, $G_2$ move in the directions opposite to each other. The field curvature when focusing on the short distance object point remarkably fluctuates in the positive direction. Therefore, it follows that the short distance compensation is excessively conducted. Undesirably, the image-forming performance contrarily worsens.

Further, as a special solution, if the second lens group $G_2$ is fixed during focusing as shown in a third embodiment, namely when $X_2 = 0$, there is included a relation such as $X_2/X_1 = 0$. This implies that the uniform and good delineative performance is obtainable at each object distance by the following steps. A refractive power arrangement of the first and second lens groups $G_1$, $G_2$ is set to obtain a proper value of the conversion inclination ($\alpha$-value). The directions in which a spherical aberration and the field curvature fluctuate are substantially equalized. Occurrence quantities thereof are also substantially equalized. Further, the aberration during focusing on the short distance object point is compensated. Moreover, for exhibiting sufficient effects of the present invention, if the upper limit is set to 0.8, the fluctuation in the field curvature is more stabilized. A more favorable result is to be obtained.

The conditional formula (2) provides a condition for setting the conversion inclination α of the paraxial infinity ray incident on the closest-to-object lens surface of the second lens group G₂.

Herein, according to a description on pp.19~20, [Lens Designing Method] written by Kitsuya Matsui (Kyoritsu Publishing Co., Ltd.), the conversion inclination α is a value obtained by multiplying the angle between the paraxial ray emerging from an on-axis infinity object point and incident on the closest-to-object lens surface of the second lens group G₂ and the optical axis by the refractive index of the medium just before this surface. Generally, this value is well known as the conversion inclination α in the paraxial ray tracing formula. The conversion inclination is obtained in the following ray tracing formula. However, the initial values $\alpha_1$, $h_1$ of the paraxial ray incident on the first surface closest to the object are set such as $\alpha_1=0$, $h_1=f$ (f is the synthetic focal length of the whole lens system).

$$a_{K}' = a_k + h_k \cdot \psi_k$$

$$a_{k+1} = a_{k}'$$

$$h_{k+1} = h_k - e_{k}' a_{k}'$$

where
$a_k \equiv N_k \cdot U_k$
$a_{k}' \equiv N_{k}' \cdot U_{k}' \equiv N_{k+1} \cdot U_{k+1}$
$\psi_k \equiv (N_{k}' - N_k)/r_k$
$e_{k}' \equiv d_{k}'/N_{k}'$ $r_k$: the radius of curvature of the k-th surface,
$h_k$: the distance of incidence on the k-th surface,
$\psi_k$: the refracting power of vertex of the k-th surface,
$U_k$: the angle between the paraxial ray incident on the k-th surface and the optical axis,
$d_k$: the vertex space between the k-th surface and the (k+1) th surface, and
$N_k$, $N_{k+1}$: the refractive index with respect to the d-line.

Briefly explaining the conversion inclination α acquired by the above-mentioned paraxial ray tracing formula, this is, it can be said, a value obtained by multiplying the angle between the paraxial marginal ray emerging from the on-axis infinity object point and the optical axis by the refractive index of the closest-to-object medium just before the closest-to-object lens surface. According to the present invention, because of being in the air, the refractive index of the closer-to-object medium just before the lens surface is 1. It can be considered that the conversion inclination α is simply an angle of the paraxial marginal ray to the optical axis.

Herein, according to the present invention, the reason why the conversion inclination α-value is required to be set will be elucidated. The conditional formula (1) may be satisfied for a good short distance compensation, particularly for restraining the fluctuation in the field curvature. For further improving the image-forming performance, however, it is required that when altering the space between the first and second lens groups G₁, G₂, a remarkable fluctuation in an aberration other than the field curvature-especially in the spherical aberration-should not ensue. For preventing the outstanding fluctuation in the spherical aberration, it is of importance to avoid an extreme convergence or divergence of the paraxial marginal ray of the on-axis infinity ray (hereinafter to be called [Rand ray]) that is incident on the closest-to-object lens surface of the second lens group G₂. Ideally, if the Rand ray is incident substantially in parallel on the closest-to-object lens surface of the second lens group G₂, it is possible to substantially prevent the fluctuation in the spherical aberration even by altering the air space between the first and second lens groups G₁, G₂. Hence, the aberration is sufficiently compensated as in the present invention. It can be then considered that the conversion inclination α defined as an angle between the paraxial infinity ray and the optical axis substitutes for the angle between the Rand ray and the optical axis. Therefore, a degree of fluctuation in the spherical aberration can be presumed from the angle between the paraxial infinity ray and the optical axis, i.e., a value of the conversion inclination α.

If over an upper limit of the conditional formula (2), the Rand ray incident on the closest-to-object lens surface of the second lens group G₂ is remarkably converged. If the air space between the first and second lens groups G₁, G₂ is expanded for focusing, a distance of incidence of the Rand ray entering the second lens group G₂ generally having the positive refracting power is outstandingly decreased, though different depending on a moving ratio of the first lens group G₁ to the second lens group G₂, the refracting power of the second lens group G₂ and an existence or non-existence of an intensive divergent surface of the second lens group G₂. The spherical aberration therefore fluctuates in a direction of overcompensation. It is undesirably impossible to balance well with the field curvature.

Whereas if under a lower limit of the conditional formula (2), the Rand ray incident on the closest-to-object lens surface of the second lens group G₂ strikingly diverges. Hence, if the air space between the first and second lens groups G₁, G₂ is expanded for focusing, though different depending on the moving ratio of the first lens group G₁ to the second lens group G₂, the refracting power of the second lens group G₂ and the existence or non-existence of the intensive divergent surface of the second lens group G₂, the distance of incidence of the Rand ray incident on the second lens group G₂ generally having the positive refracting power remarkably increases. The spherical aberration therefore fluctuates in a direction of undercompensation. It is thus impossible to balance well with the field curvature. Disadvantageously, the image-forming performance declines.

According to the present invention, the fluctuations both in the field curvature and in the spherical aberration during the short distance compensation are not set to 0. Even in such a case, the conversion inclination α-value and the moving ratio of X₂/X₁ are selected to fluctuate in the same direction, i.e., they are selected so that when the field curvature fluctuates toward a minus, the spherical aberration also fluctuates slightly toward the minus. In this case also, the image-forming performance with respect to a flatness of the image surface, etc. can be enhanced.

Besides, for the purpose of reducing the moving quantity of the lens during focusing and also obtaining the excellent image-forming performance, preferably the following conditions are further satisfied:

$$1 \leq f_2/f \leq 5 \qquad (3)$$

$$0.15 \leq n_p - n_n \qquad (4)$$

$$52 \leq \nu d_1 \quad (5)$$

where
- f: the focal length of the whole lens system,
- $f_2$: the synthetic focal length of the second lens group $G_2$,
- $n_P$: the refractive index, with respect to the d-line, of the positive lens constituting a part of the closest-to-image cemented lens of the second lens group $G_2$,
- $n_n$: the refractive index, with respect to the d-line, of the negative lens constituting a part of the closest-to-image cemented lens of the second lens group $G_2$, and
- $\nu d_1$: the Abbe number of the negative meniscus lens $L_1$ positioned closest to the object.

The conditional formula (3) provides a condition for setting the focal length of the second lens group $G_2$ having the positive refracting power. If over an upper limit of the conditional formula (3), the first and second lens groups $G_1$, $G_2$ increase in terms of moving quantities during focusing. In the case of the fisheye lens including a front lens element having a large aperture, it follows that a throughput strikingly augments due to focusing. The operability gets worse. Besides, this brings about an increase in size of the overall system.

Whereas if under a lower limit of the conditional formula (3), this resultantly leads to a deterioration of the spherical aberration. In addition, an allowable tolerance with respect to the eccentricity undesirably becomes strict as a problem in a manufacturing aspect.

The conditional formula (4) provides a condition for setting a difference between the refractive indices of the rearmost cemented lens (toward the image) of the second lens group $G_2$. If over an upper limit of the conditional formula (4), the Petzval's sum becomes too small, resulting in a plus shift of the sagittal image surface. The excellent image-forming performance can not be obtained. Undesirably, the spherical aberration is also hard to compensate.

The conditional formula (5) provides a condition for setting the Abbe number of the negative meniscus lens $L_1$ of the first lens group $G_1$. If over an upper limit of this conditional formula (5), it is disadvantageously difficult to compensate a chromatic aberration of magnification that has been particularly hard to compensate in the fisheye lens.

By the way, it is, as a matter of course, feasible to design a brighter fisheye lens and compensate the field curvature and a coma by incorporating an aspherical surface into the optical system of this invention as in the conventional method of utilizing the aspherical surface.

Next, a detailed description of each embodiment of this invention will be given.

Figure 1:
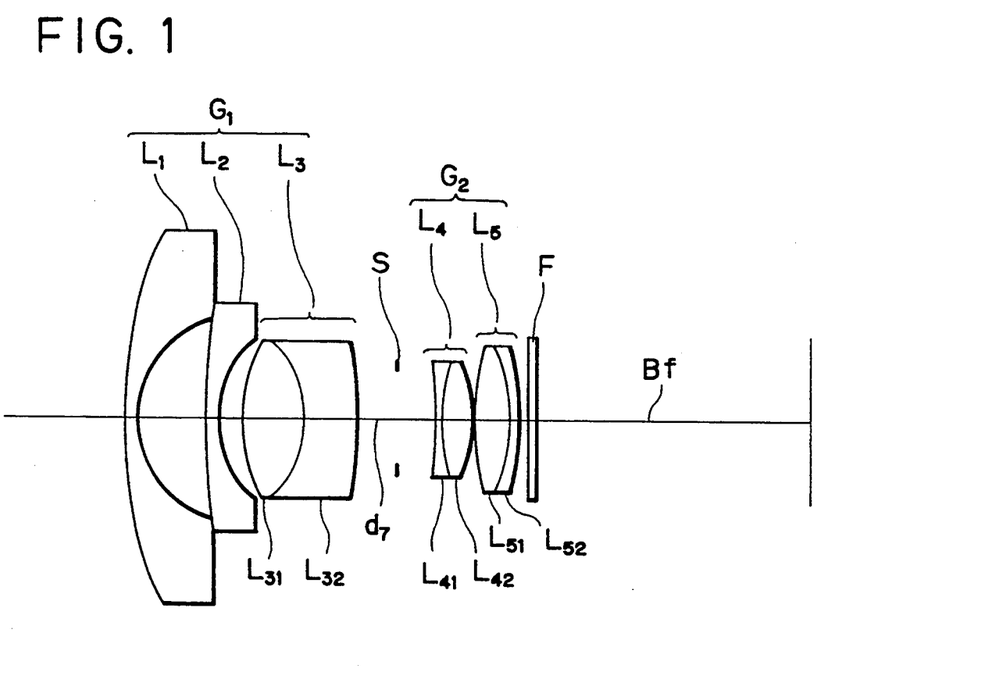
FIG. 1 is a view illustrating a lens geometry in a first embodiment of this invention.

FIG. 1 is a view illustrating a lens geometry in a first embodiment. The fisheye lens comprises, sequentially from the object, the first lens group $G_1$, the second lens group $G_2$ and a filter F. The first lens group $G_1$ is constructed of a negative meniscus lens $L_1$ with its convex surface toward the object, a negative meniscus lens $L_2$ with its convex surface similarly toward the object and a cemented positive lens $L_3$ consisting of a biconvex positive lens $L_{31}$ and a negative meniscus lens $L_{32}$. The second lens group $G_2$ is constructed of an aperture stop S, a cemented positive lens $L_4$ consisting of a biconcave negative lens $L_{41}$ and a biconvex positive lens $L_{42}$ and a cemented positive lens $L_5$ consisting of a biconvex positive lens $L_{51}$ and a negative meniscus lens $L_{52}$.

The following are values of items in the first through sixth embodiments of this invention. In the following Tables of the items in the embodiments, the symbol f is the focal length, $F_{NO}$ is the F-number, and $2\omega$ is the field angle. Then, the numerals at the left end represent the order from the object side. The symbol r is the radius of curvature of the lens surface, d is the space between the lens surfaces. The refractive index n and the Abbe number $\nu$ are values with respect to the d-line ($\lambda = 587.6$ nm). The symbol d0 is the distance from the object to the top of the closest-to-object lens, Bf is the back focus, and $\beta$ is the magnification.

TABLE 1

[First Embodiment]
f = 15.7
$2\omega = 180°$
$F_{NO} = 2.9$

| | r | d | $\nu$ | n |
|---|---|---|---|---|
| 1 | 69.258 | 1.70 | 60.0 | 1.64000 |
| 2 | 15.165 | 10.25 | | |
| 3 | 130.505 | 1.70 | 60.1 | 1.62041 |
| 4 | 14.794 | 4.00 | | |
| 5 | 32.412 | 8.00 | 35.7 | 1.62588 |
| 6 | −15.298 | 9.00 | 45.4 | 1.79668 |
| 7 | −38.750 | (d7) | | |
| 8 | −81.004 | 1.20 | 40.8 | 1.58144 |
| 9 | 24.002 | 5.00 | 58.9 | 1.51823 |
| 10 | −20.609 | 0.10 | | |
| 11 | 46.733 | 5.50 | 70.0 | 1.51860 |
| 12 | −19.219 | 1.30 | 26.1 | 1.78470 |
| 13 | −40.706 | 0.88 | | |
| 14 | 0.000 | 1.20 | 64.1 | 1.51680 |
| 15 | 0.000 | (Bf) | | |

(Variable space during infinity focusing and short distance focusing when $\beta = 1/30$)

| f | 15.6686 |
|---|---|
| D0 | ∞ |
| d7 | 10.9883 |
| Bf | 38.5974 |
| $\beta$ | −0.0333 |
| D0 | 457.2746 |
| d7 | 11.3033 |
| Bf | 39.0700 |

Note that the condition corresponding values in the embodiments discussed above are shown as below.

$$X_2/X_1 = 0.6 \quad (1)$$

$$\alpha = -0.3893 \quad (2)$$

$$f_2/f = 1.96 \quad (3)$$

$$n_n - n_p = 0.266 \quad (4)$$

$$\nu d_1 = 60.0 \quad (5)$$

Figure 2:
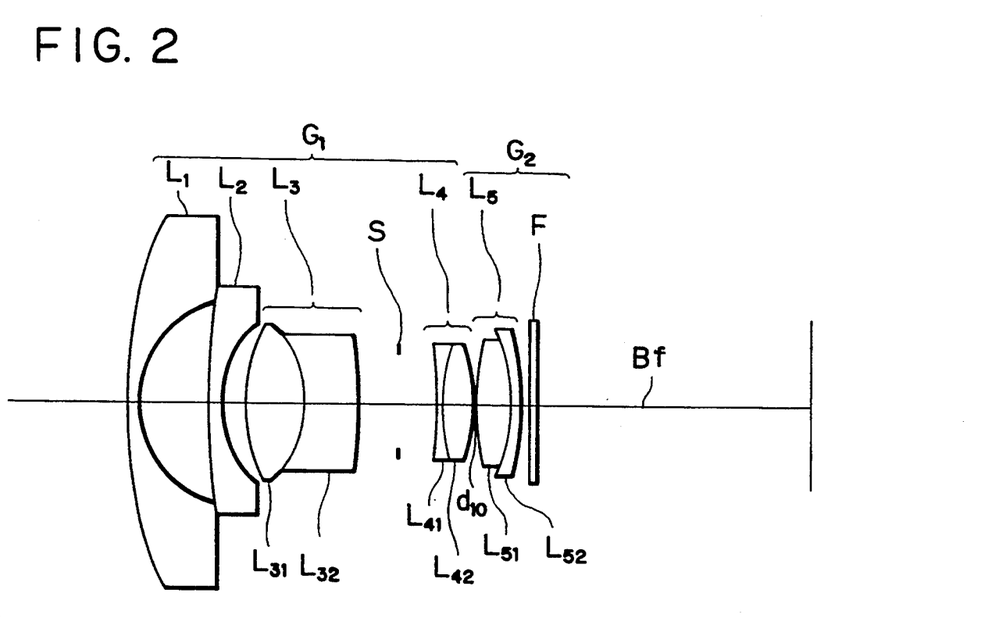
FIG. 2 is a view illustrating a lens geometry in a second embodiment of this invention.

FIG. 2 is a view illustrating a lens geometry in a second embodiment. The fisheye lens comprises, sequentially from the object, the first lens group $G_1$, the second lens group $G_2$ and a filter F. The first lens group $G_1$ is constructed of a negative meniscus lens $L_1$ with its convex surface toward the object, a negative meniscus lens $L_2$ with its convex surface similarly toward the object, a cemented positive lens $L_3$ consisting of a biconvex positive lens $L_{31}$ and a negative meniscus lens $L_{32}$, the aperture stop S and a cemented positive lens $L_4$ consisting of a biconcave negative lens $L_{41}$ and a biconvex positive lens $L_{42}$. The second lens group $G_2$ is constructed of a cemented positive lens $L_5$ consisting of a biconcave positive lens $L_{51}$ and a negative meniscus lens $L_{52}$.

TABLE 2

[Second Embodiment]
$f = 15.7$
$2\omega = 180°$
$F_{NO} = 2.9$

| | r | d | ν | n |
|---|---|---|---|---|
| 1 | 69.258 | 1.70 | 60.0 | 1.64000 |
| 2 | 15.165 | 10.25 | | |
| 3 | 130.505 | 1.70 | 60.1 | 1.62041 |
| 4 | 14.794 | 4.00 | | |
| 5 | 32.412 | 8.00 | 35.7 | 1.62588 |
| 6 | −15.298 | 9.00 | 45.4 | 1.79668 |
| 7 | −38.750 | 10.98 | | |
| 8 | −81.004 | 1.20 | 40.8 | 1.58144 |
| 9 | 24.002 | 5.00 | 58.9 | 1.51823 |
| 10 | −20.608 | (d10) | | |
| 11 | 46.733 | 5.50 | 70.0 | 1.51860 |
| 12 | −19.219 | 1.30 | 26.1 | 1.78470 |
| 13 | −40.706 | 0.85 | | |
| 14 | 0.000 | 1.20 | 64.1 | 1.51680 |
| 15 | 0.000 | (Bf) | | |

(Variable space during infinity focusing and short distance focusing when $\beta = 1/30$)

| f | 15.6686 |
|---|---|
| D0 | ∞ |
| d10 | 0.0890 |
| Bf | 38.6304 |
| β | −0.0333 |
| D0 | 461.5288 |
| d10 | 1.0964 |
| Bf | 39.0621 |

Note that the condition corresponding values in the embodiments discussed above are shown as below.

$X_2/X_1 = 0.3$      (1)

$\alpha = 0.3033$      (2)

$f_2/f = 3.91$      (3)

$n_n - n_P = 0.266$      (4)

$\nu d_1 = 60.0$      (5)

Figure 3:
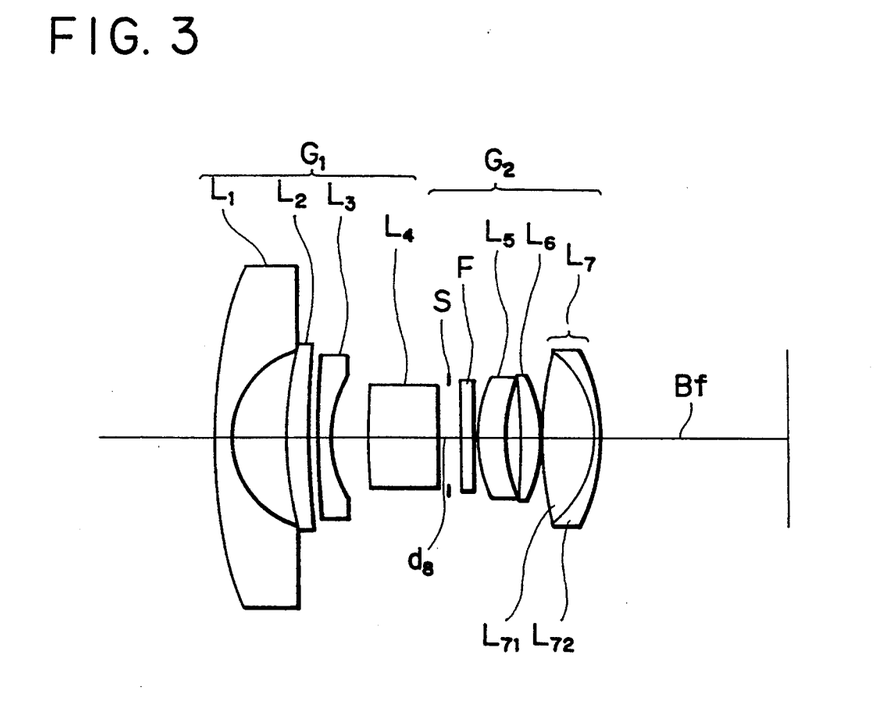
FIG. 3 is a view illustrating a lens geometry in a third embodiment of this invention.

FIG. 3 is a view illustrating a lens geometry in a third embodiment. The fisheye lens comprises, sequentially from the object, the first lens group $G_1$ and the second lens group $G_2$. The first lens group $G_1$ is constructed of a negative meniscus lens $L_1$ with its convex surface toward the object, a positive meniscus lens $L_2$ with its convex surface toward the object, a negative meniscus lens $L_3$ with its convex surface toward the object and a biconvex positive lens $L_4$ with its surface having a larger curvature toward the object. The second lens group $G_2$ is constructed of an aperture stop S, a filter F, a positive meniscus lens $L_5$ with its convex surface toward the object, a positive meniscus lens $L_6$ with its convex surface toward the image and a cemented positive lens $L_7$ consisting of a biconvex positive lens $L_{71}$ and a negative meniscus lens $L_{72}$.

TABLE 3

[Third Embodiment]
$f = 15.4$
$2\omega = 180°$
$F_{NO} = 2.84$

| | r | d | ν | n |
|---|---|---|---|---|
| 1 | 66.028 | 1.96 | 57.5 | 1.67025 |
| 2 | 12.061 | 8.00 | | |
| 3 | 59.825 | 2.95 | 25.5 | 1.73038 |
| 4 | 300.320 | 0.98 | | |
| 5 | 223.777 | 1.96 | 60.0 | 1.64000 |
| 6 | 17.224 | 4.90 | | |
| 7 | 62.981 | 9.80 | 28.3 | 1.72825 |
| 8 | −171.272 | (d8) | | |
| 9 | 0.000 | 1.80 | 64.2 | 1.51680 |
| 10 | 0.000 | 0.78 | | |
| 11 | 20.191 | 3.90 | 65.7 | 1.46450 |
| 12 | 21.788 | 1.65 | | |
| 13 | −76.172 | 2.80 | 65.7 | 1.46450 |
| 14 | −17.891 | 0.05 | | |
| 15 | 42.043 | 7.36 | 70.4 | 1.48749 |
| 16 | −13.281 | 1.00 | 23.0 | 1.86074 |
| 17 | −21.946 | (Bf) | | |

(Variable space during infinity focusing and short distance focusing when $\beta = 1/30$)

| f | 15.4091 |
|---|---|
| D0 | ∞ |
| d8 | 2.9400 |
| Bf | 38.0000 |
| β | −0.0333 |
| D0 | 449.7175 |
| d8 | 3.1813 |
| Bf | 38.3615 |

Note that the condition corresponding values in the embodiments discussed above are shown as below.

$X_2/X_1 = 0.6$      (1)

$\alpha = -0.7854$      (2)

$f_2/f = 1.58$      (3)

$n_n - n_P = 0.373$      (4)

$\nu d_1 = 57.5$

Figure 4:
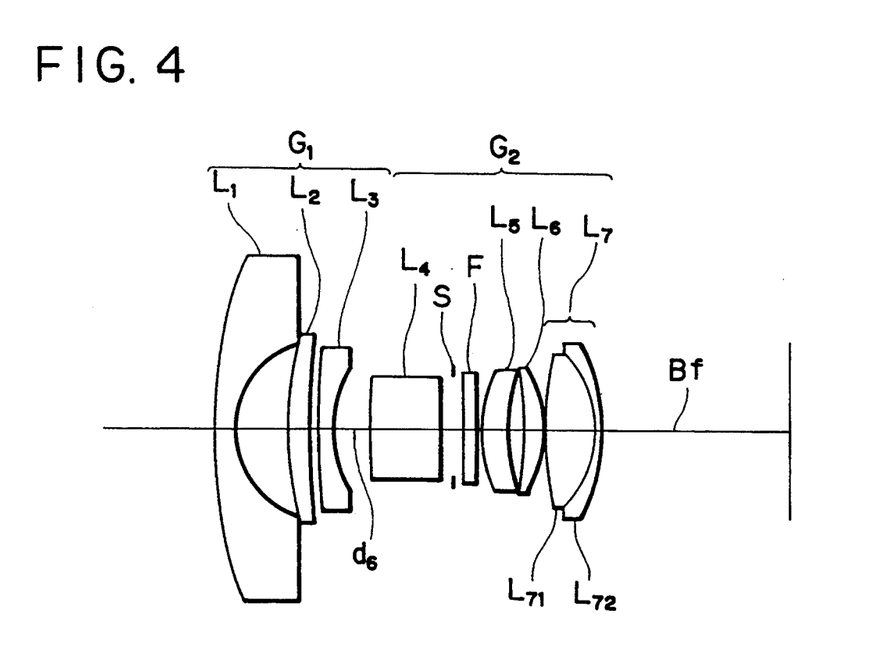
FIG. 4 is a view illustrating a lens geometry in a fourth embodiment of this invention.

FIG. 4 is a view illustrating a lens geometry in a fourth embodiment. The fisheye lens comprises, sequentially from the object, the first lens group $G_1$ and the second lens group $G_2$. The first lens group $G_1$ is constructed of a negative meniscus lens $L_1$ with its convex surface toward the object, a positive meniscus lens $L_2$ with its convex surface toward the object and a negative meniscus lens $L_3$ with its convex surface toward the object. The second lens group $G_2$ is constructed of a biconvex positive lens $L_4$ with its surface having a larger curvature toward the object, an aperture stop S, a filter F, a positive meniscus lens $L_5$ with its convex surface toward the object, a positive meniscus lens $L_6$ with its convex surface toward the image and a cemented lens $L_7$ consisting of a biconvex positive lens $L_{71}$ and a negative meniscus lens $L_{72}$. Note that the second lens group $G_2$ is fixed.

TABLE 4

[Fourth Embodiment]
f = 15.4
2ω = 180°
$F_{NO} = 2.87$

| | r | d | ν | n |
|---|---|---|---|---|
| 1 | 65.933 | 1.96 | 57.5 | 1.67025 |
| 2 | 12.013 | 8.00 | | |
| 3 | 58.325 | 2.95 | 25.5 | 1.73038 |
| 4 | 312.507 | 0.96 | | |
| 5 | 216.905 | 1.96 | 60.0 | 1.64000 |
| 6 | 17.063 | (d6) | | |
| 7 | 63.606 | 9.71 | 28.3 | 1.72825 |
| 8 | −166.033 | 2.94 | | |
| 9 | 0.000 | 1.80 | 64.2 | 1.51680 |
| 10 | 0.000 | 0.78 | | |
| 11 | 20.159 | 3.90 | 65.8 | 1.46450 |
| 12 | 21.871 | 1.65 | | |
| 13 | −75.031 | 2.80 | 65.8 | 1.46450 |
| 14 | −17.884 | 0.05 | | |
| 15 | 41.834 | 7.36 | 70.5 | 1.48749 |
| 16 | −13.257 | 1.00 | 23.0 | 1.86074 |
| 17 | −22.051 | (Bf) | | |

(Variable space during infinity focusing and short distance focusing when β=1/30)

| f | 15.4091 |
|---|---|
| D0 | ∞ |
| d6 | 5.0214 |
| Bf | 38.0008 |
| β | −0.0333 |
| D0 | 444.7335 |
| d6 | 5.3444 |
| Bf | 38.0008 |

Note that the condition corresponding values in the embodiments discussed above are shown as below.

$X_2/X_1 = 0$     (1)

$\alpha = -1.2610$     (2)

$f_2/f = 1.41$     (3)

$n_n - n_p = 0.373$     (4)

$\nu d_1 = 57.5$

Figure 5:
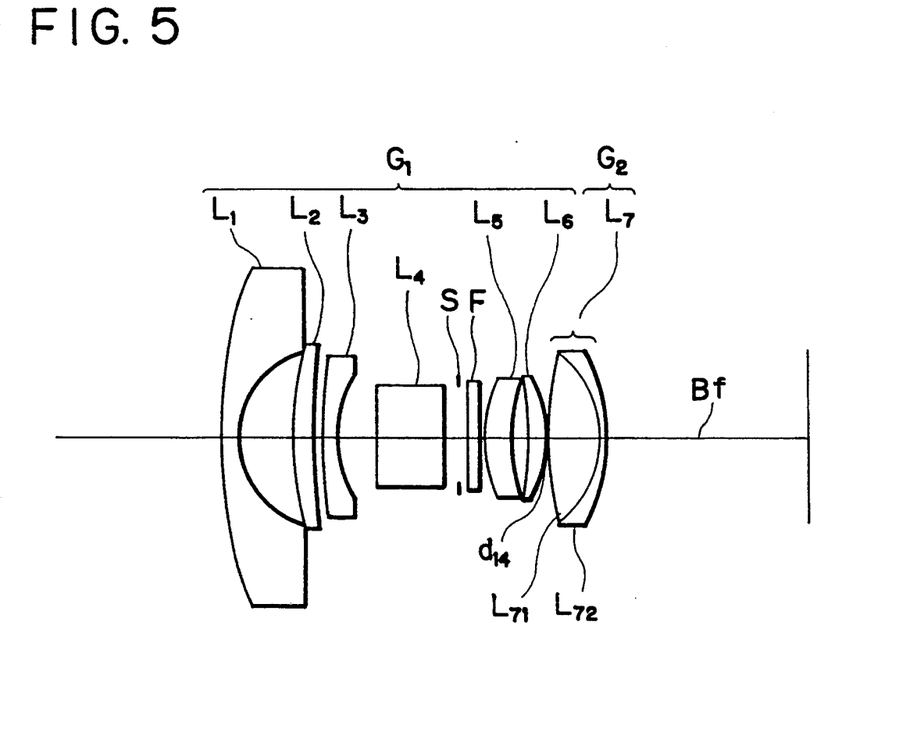
FIG. 5 is a view illustrating a lens geometry in a fifth embodiment of this invention.

FIG. 5 is a view illustrating a lens geometry in a fifth embodiment. The fisheye lens comprises, sequentially from the object, the first lens group G₁ and the second lens group G₂. The first lens group G₁ is constructed of a negative meniscus lens L₁ with its convex surface toward the object, a positive meniscus lens L₂ with its convex surface toward the object, a negative meniscus lens L₃ with its convex surface toward the object, a biconvex positive lens L₄, an aperture stop S, a filter F, a positive meniscus lens L₅ with its convex surface toward the object and a positive meniscus lens L₆ with its convex surface toward the image. The second lens group G₂ is constructed of a cemented positive lens L₇ consisting of a biconvex positive lens L₇₁ and a negative meniscus lens L₇₂.

TABLE 5

[Fifth Embodiment]
f = 15.4
2ω = 180°
$F_{NO} = 2.86$

| | r | d | ν | n |
|---|---|---|---|---|
| 1 | 66.028 | 1.96 | 57.5 | 1.67025 |
| 2 | 12.061 | 8.00 | | |
| 3 | 59.825 | 2.95 | 25.5 | 1.73038 |
| 4 | 300.320 | 0.98 | | |
| 5 | 223.777 | 1.96 | 60.0 | 1.64000 |
| 6 | 17.224 | 4.90 | | |
| 7 | 62.981 | 9.80 | 28.3 | 1.72825 |
| 8 | −171.273 | 2.94 | | |
| 9 | 0.000 | 1.80 | 64.2 | 1.51680 |
| 10 | 0.000 | 0.78 | | |
| 11 | 20.191 | 3.90 | 65.8 | 1.46450 |
| 12 | 21.788 | 1.65 | | |
| 13 | −76.172 | 2.80 | 65.8 | 1.46450 |
| 14 | −17.891 | (d14) | | |
| 15 | 42.043 | 7.36 | 70.4 | 1.48749 |
| 16 | −13.281 | 1.00 | 23.0 | 1.86074 |
| 17 | −21.946 | (Bf) | | |

(Variable space during infinity focusing and short distance focusing when β=1/30)

| f | 15.4091 |
|---|---|
| D0 | ∞ |
| d14 | 0.0500 |
| Bf | 37.9996 |
| β | −0.0333 |
| D0 | 453.6264 |
| d14 | 0.3253 |
| Bf | 38.5108 |

Note that the condition corresponding values in the embodiments discussed above are shown as below.

$X_2/X_1 = 0.65$     (1)

$\alpha = 0.0999$     (2)

$f_2/f = 2.9$     (3)

$n_n - n_p = 0.373$     (4)

$\nu d_1 = 57.5$

Figure 6:
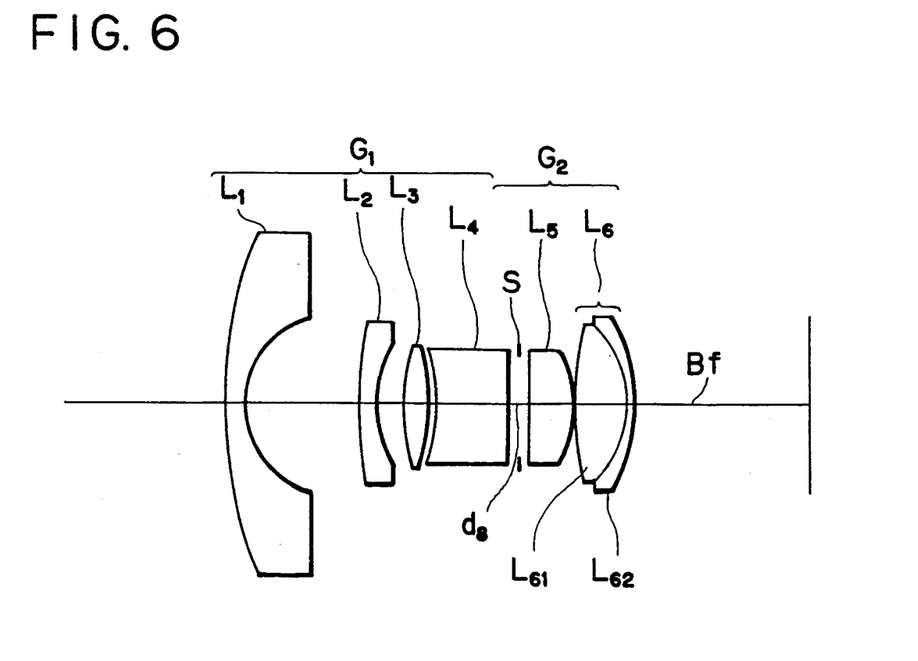
FIG. 6 is a view illustrating a lens geometry in a sixth embodiment of this invention.

FIG. 6 is a view illustrating a lens geometry in a sixth embodiment. The fisheye lens comprises, sequentially from the object, the first lens group G₁ and the second lens group G₂. The first lens group G₁ is constructed of a negative meniscus lens L₁ with its convex surface toward the object, a negative meniscus lens L₂ with its convex surface similarly toward the object, a biconvex positive lens L₃ and a biconcave negative lens L₄. The second lens group G₂ is constructed of an aperture stop S, a biconvex positive lens L₅ with its convex surface having a larger curvature toward the image and a cemented positive lens L₆ consisting of a biconvex positive lens L₆₁ and a negative meniscus lens L₆₂.

TABLE 6

[Sixth Embodiment]
f = 15.3
2ω = 180°
$F_{NO} = 2.83$

| | r | d | ν | n |
|---|---|---|---|---|
| 1 | 73.110 | 2.47 | 55.5 | 1.69680 |
| 2 | 15.370 | 14.83 | | |
| 3 | 40.310 | 2.47 | 43.9 | 1.78590 |
| 4 | 13.520 | 5.27 | | |
| 5 | 24.210 | 3.51 | 26.6 | 1.76182 |

TABLE 6-continued

[Sixth Embodiment]
f = 15.3
2ω = 180°
F_{NO} = 2.83

|   | r        | d     | v    | n       |
|---|----------|-------|------|---------|
| 6 | −44.260  | 1.00  |      |         |
| 7 | −31.100  | 12.14 | 33.4 | 1.80610 |
| 8 | 1200.000 | (d8)  |      |         |
| 9 | 174.000  | 6.42  | 70.4 | 1.48749 |
| 10| −17.950  | 0.10  |      |         |
| 11| 53.680   | 5.05  | 70.4 | 1.48749 |
| 12| −14.000  | 1.00  | 25.5 | 1.80518 |
| 13| −30.720  | (Bf)  |      |         |

(Variable space during infinity focusing and short distance focusing when β=1/30)

| f  | 15.3008  |
|----|----------|
| D0 | ∞        |
| d8 | 3.2700   |
| Bf | 38.9928  |
| β  | −0.0333  |
| D0 | 443.8347 |
| d8 | 3.5129   |
| Bf | 39.3571  |

Note that the condition corresponding values in the embodiments discussed above are shown as below.

$X_2/X_1 = 0.6$      (1)

$\alpha = -0.7671$      (2)

$f_2/f = 1.58$      (3)

$n_n - n_P = 0.318$      (4)

$\nu d_1 = 55.5$

The above-described embodiments of the present invention provide the so-called diagonal fisheye lens having a field angle of 180° in a direction of a diagonal line of a picture. This invention is of course applicable to an all-round fisheye lens (circular image fisheye lens) having a field angle of 180° in the all-round direction. Further, sufficient performance can be acquired even by increasing or decreasing somewhat the condition corresponding values with respect to the moving quantity of $X_2/X_1$ shown in each embodiment. Still further, the aperture stop S may be, as shown in the embodiments described above, disposed in a variety of positions. Then, the invention can be also developed by combining internal focusing and rear focusing with this invention.

Note that the plane glass (parallel plate) F incorporated into each embodiment of this invention is a so-called filter and can be so designed as to be disposed everywhere in the optical system. Whereas if disposed nowhere in the optical system, the fundamental optical performance is not conditioned by this.

As discussed above, the fluctuation in the aberration at the short distance that could not be compensated by the conventional fisheye lens is compensated in the form of short distance compensation. It is thus possible to actualize the compact and bright fisheye lens exhibiting a high performance.

It is apparent that, in this invention, a wide range of different working modes can be formed based on the invention without deviating from the spirit and scope of the invention. This invention is not restricted by its specific working modes except being limited by the appended claims.

What is claimed is:

1. A fisheye lens incorporating a short distance compensating function, comprising:
   a first lens group including at least one negative meniscus lens, positioned closest to an object, with its convex surface toward the object and at least one positive lens;
   a second lens group including a cemented positive lens consisting of a positive lens and a negative lens and disposed closer to an image than said first lens group to have positive refractive power on the whole,
   wherein when focusing from an infinity object point onto a short distance object point, at least said first lens group moves on the optical axis toward the object to expand an air space between said first and second lens groups, and moving quantities thereof are set to satisfy the following condition:

$0 \leq X_2/X_1 \leq 0.9$ where $X_1$ is the moving quantity of said first lens group $G_1$ during focusing, and $X_2$ is the moving quantity of said second lens group $G_2$ during focusing.

2. The fisheye lens according to claim 1, wherein said first lens group is constructed so that a conversion inclination is set to satisfy the following condition:

$-1.5 \leq \alpha 1$ where $\alpha$ is the conversion inclination obtained by multiplying an angle between the paraxial marginal ray emerging from an on-axis infinity object point that is incident on the closest-to-object lens surface of said second lens group and the optical axis by a refractive index of a medium just before said surface.

3. The fisheye lens according to claim 1, wherein said second lens group is constructed to further satisfy the following condition:

$1 \leq f_2/f \leq 5$ where f is the focal length of the whole lens system, and $f_2$ is the focal length of said second lens group.

4. The fisheye lens group according to claim 1, wherein said first lens group is constructed to satisfy the following condition:

$52 \leq \nu d_1$ where $\nu d_1$ is the Abbe number of said negative meniscus lens positioned closest to the object in said first lens group.

5. The fisheye lens according to claim 1, wherein said second lens group includes a cemented positive lens positioned closest to the image and consisting of a positive lens and a negative lens, and said cemented positive lens is constructed to satisfy the following condition:

$0.15 \leq n_P - n_n$ where
   $n_P$: the refractive index, with respect to the d-line, of said positive lens constituting a part of said closestto-image cemented lens of said second lens group, and $n_n$: the refractive index, with respect to the d-line, of said negative lens constituting a part of said closest-to-image cemented lens of said second lens group.

6. The fisheye lens according to claim 1, wherein said first and second lens groups are so constructed as to be relatively movable to further satisfy the following condition:

$$0 \leq X_2/X_1 \leq 0.8$$

where $X_1$: the moving quantity of said first lens group during focusing, and $X_2$: the moving quantity of said second lens group during focusing.

7. The fisheye lens according to claim 1, wherein said first lens group is constructed of, sequentially from the object, a first negative meniscus lens with its convex surface toward the object, a second negative meniscus lens with its convex surface toward the object and a cemented positive lens consisting of a biconvex positive lens and a negative meniscus lens, said second lens group is constructed of, sequentially from, a cemented lens consisting of a negative lens and a biconvex positive lens and a cemented lens consisting of a biconvex positive lens and a negative meniscus lens, an aperture stop is disposed between said first and second lens groups, and a filter is disposed closer to the image than said second lens group.

8. The fisheye lens according to claim 1, wherein said first lens group is constructed of, sequentially from the object, a first meniscus lens with its convex surface toward the object, a second negative meniscus lens with its convex surface toward the object, a cemented positive lens consisting of a biconvex positive lens and a negative meniscus lens, an aperture stop and a cemented positive lens consisting of a negative lens and a biconvex positive lens, said second lens group is constructed of a cemented positive lens consisting of a biconvex positive lens and a negative meniscus lens, and a filter is disposed closer to the image than said second lens group.

9. The fisheye lens according to claim 1, wherein said first lens group is constructed of, sequentially from the object, a first negative meniscus lens with its convex surface toward the object, a positive meniscus lens with its convex surface toward the object, a second negative meniscus lens with its convex surface toward the object and a biconvex positive lens, said second lens group is constructed of, sequentially from the object, a filter, a positive meniscus lens with its convex surface toward the object, a positive meniscus lens with its convex surface toward the image and a cemented positive lens consisting of a biconvex positive lens and a negative meniscus lens, and an aperture stop is disposed between said first lens group and said filter of said second lens group.

10. The fisheye lens according to claim 1, wherein said first lens group is constructed of, sequentially from the object, a first negative meniscus lens with its convex surface toward the object, a positive meniscus lens with its convex surface toward the object and a second negative meniscus lens with its convex surface toward the object, and second lens group is constructed of, sequentially from the object, a biconvex positive lens, an aperture stop, a filter, a positive meniscus lens with its convex surface toward the object, a positive meniscus lens with its convex surface toward the image and a cemented lens consisting of a biconvex positive lens and a negative meniscus lens.

11. The fisheye lens according to claim 1, wherein said first lens group is constructed of, sequentially from the object, a first negative meniscus lens with its convex surface toward the object, a positive meniscus lens with its convex surface toward the object, a second negative meniscus lens with its convex surface toward the object, a biconvex positive lens, an aperture stop, a filter, a positive meniscus lens with its convex surface toward the object and a positive meniscus lens with its convex surface toward the image, and said second lens group is constructed of only a cemented positive lens consisting of a biconvex positive lens and a negative meniscus lens.

12. The fisheye lens according to claim 1, wherein said first lens group is constructed of, sequentially from the object, a first negative meniscus lens with its convex surface toward the object, a second negative meniscus lens with its convex surface similarly toward the object, a biconvex positive lens and a negative lens with its closer-to-object concave surface toward the object, said second lens group is constructed of a positive lens with its convex surface having a larger curvature toward the image and a cemented positive lens consisting of a biconvex positive lens and a negative meniscus lens, and an aperture stop is disposed between said first and second lens groups.

13. The fisheye lens according to claim 1, wherein said lens is constructed in accordance with the following data:

| | f = 15.7 2ω = 180° $F_{NO}$ =2.9 | | | |
|---|---|---|---|---|
| | r | d | ν | n |
| 1 | 69.258 | 1.70 | 60.0 | 1.64000 |
| 2 | 15.165 | 10.25 | | |
| 3 | 130.505 | 1.70 | 60.1 | 1.62041 |
| 4 | 14.794 | 4.00 | | |
| 5 | 32.412 | 8.00 | 35.7 | 1.62588 |
| 6 | −15.298 | 9.00 | 45.4 | 1.79668 |
| 7 | −38.750 | (d7) | | |
| 8 | −81.004 | 1.20 | 40.8 | 1.58144 |
| 9 | 24.002 | 5.00 | 58.9 | 1.51823 |
| 10 | −20.609 | 0.10 | | |
| 11 | 46.733 | 5.50 | 70.0 | 1.51860 |
| 12 | −19.219 | 1.30 | 26.1 | 1.78470 |
| 13 | −40.706 | 0.88 | | |
| 14 | 0.000 | 1.20 | 64.1 | 1.51680 |
| 15 | 0.000 | (Bf) | | |

(Variable space during infinity focusing and short distance focusing when $\beta = 1/30$)

| | |
|---|---|
| f | 15.6686 |
| D0 | ∞ |
| d7 | 10.9883 |
| Bf | 38.5974 |
| β | −0.0333 |
| D0 | 457.2746 |
| d7 | 11.3033 |
| Bf | 39.0700 |

Note that the condition corresponding values in the embodiments discussed above are shown as below:

$$X_2/X_1 = 0.6 \tag{1}$$

$$\alpha = -0.3898 \tag{2}$$

$f_2/f=1.96$ (3)

$n_n-n_P=0.266$ (4)

$\nu d_1=60.0$ (5)

where in the Table given above, f is the focal length, $F_{NO}$ is the F-number, and $2\omega$ is the field angle, the numerals at the left end then represent the order from the object side, r is the radius of curvature of the lens surface, d is the space between the lens surfaces, the refractive index n and the Abbe number $\nu$ are values with respect to the d-line ($\lambda=587.6$ nm), d0 is the distance from the object to the top of the closest-to-object lens, Bf is the back focus, $\beta$ is the magnification, $\alpha$ is the conversion inclination obtained by multiplying an angle between the paraxial marginal ray emerging from an on-axis infinity object point that is incident on the closest-to-object lens surface of said second lens group and the optical axis by the refractive index of a medium just before said surface, $f_2$ is the synthetic focal length of said second lens group, $n_P$ is the refractive index, with resect to the d-line, of said positive lens constituting a part of said closest-to-image cemented lens of said second lens group, $n_n$ is the refractive index, with respect to the d-line, of said negative lens constituting a part of said closest-to-image cemented lens of said second lens group, and $\nu d_1$ is the Abbe number of said negative meniscus lens positioned closest to the object.

14. The fisheye lens according to claim 1, wherein said lens is constructed in accordance with the following data:

| | f = 15.7<br>$2\omega = 180°$<br>$F_{NO} = 2.9$ | | | |
|---|---|---|---|---|
| | r | d | $\nu$ | n |
| 1 | 69.258 | 1.70 | 60.0 | 1.64000 |
| 2 | 15.165 | 10.25 | | |
| 3 | 130.505 | 1.70 | 60.1 | 1.62041 |
| 4 | 14.794 | 4.00 | | |
| 5 | 32.412 | 8.00 | 35.7 | 1.62588 |
| 6 | −15.298 | 9.00 | 45.4 | 1.79668 |
| 7 | −38.750 | 10.98 | | |
| 8 | −81.004 | 1.20 | 40.8 | 1.58144 |
| 9 | 24.002 | 5.00 | 58.9 | 1.51823 |
| 10 | −20.608 | (d10) | | |
| 11 | 46.733 | 5.50 | 70.0 | 1.51860 |
| 12 | −19.219 | 1.30 | 26.1 | 1.78470 |
| 13 | −40.706 | 0.85 | | |
| 14 | 0.000 | 1.20 | 64.1 | 1.51680 |
| 15 | 0.000 | (Bf) | | |

(Variable space during infinity focusing and short distance focusing when $\beta=1/30$)

| f | 15.6686 |
|---|---|
| d10 | 0.0890 |
| Bf | 38.6304 |
| $\beta$ | −0.0333 |
| D0 | 461.5288 |
| d10 | 1.0964 |
| Bf | 39.0621 |

Note that the condition corresponding values in the embodiments discussed above are shown as below:

$X_2/X_1=0.3$ (1)

$\alpha=0.3033$ (2)

$f_2/f=3.91$ (3)

$n_n-n_P=0.266$ (4)

$\nu d_1=60.0$ (5)

where in the Table given above, f is the focal length, $F_{NO}$ is the F-number, and $2\omega$ is the field angle, the numerals at the left end then represent the order from the object side, r is the radius of curvature of the lens surface, d is the space between the lens surfaces, the refractive index n and the Abbe number $\nu$ are values with respect to the d-line ($\lambda=587.6$ nm), d0 is the distance from the object to the top of the closest-to-object lens, Bf is the back focus, $\beta$ is the magnification, $\alpha$ is the conversion inclination obtained by multiplying an angle between the paraxial marginal ray emerging from an on-axis infinity object point that is incident on the closest-to-object lens surface of said second lens group and the optical axis by the refractive index of a medium just before said surface, $f_2$ is the synthetic focal length of said second lens group, $n_P$ is the refractive index, with resect to the d-line, of said positive lens constituting a part of said closest-to-image cemented lens of said second lens group, $n_n$ is the refractive index, with respect to the d-line, of said negative lens constituting a part of said closes-to-image cemented lens of said second lens group, and $\nu d_1$ is the Abbe number of said negative meniscus lens positioned closest to the object.

15. The fisheye lens according to claim 1, wherein said lens is constructed in accordance with the following data:

| | f = 15.4<br>$2\omega = 180°$<br>$F_{NO} = 2.84$ | | | |
|---|---|---|---|---|
| | r | d | $\nu$ | n |
| 1 | 66.028 | 1.96 | 57.5 | 1.67025 |
| 2 | 12.061 | 8.00 | | |
| 3 | 59.825 | 2.95 | 25.5 | 1.73038 |
| 4 | 300.320 | 0.98 | | |
| 5 | 223.777 | 1.96 | 60.0 | 1.64000 |
| 6 | 17.224 | 4.90 | | |
| 7 | 62.981 | 9.80 | 28.3 | 1.72825 |
| 8 | −171.272 | (d8) | | |
| 9 | 0.000 | 1.80 | 64.2 | 1.51680 |
| 10 | 0.000 | 0.78 | | |
| 11 | 20.191 | 3.90 | 65.7 | 1.46450 |
| 12 | 21.788 | 1.65 | | |
| 13 | −76.172 | 2.80 | 65.7 | 1.46450 |
| 14 | −17.891 | 0.05 | | |
| 15 | 42.043 | 7.36 | 70.4 | 1.48749 |
| 16 | −13.281 | 1.00 | 23.0 | 1.86074 |
| 17 | −21.946 | (Bf) | | |

(Variable space during infinity focusing and short distance focusing when $\beta=1/30$)

| f | 15.4091 |
|---|---|
| D0 | ∞ |
| d8 | 2.9400 |
| Bf | 38.0000 |
| $\beta$ | −0.0333 |
| D0 | 449.7175 |
| d8 | 3.1813 |
| Bf | 38.3615 |

Note that the condition corresponding values in the embodiments discussed above are shown as below:

$X_2/X_1 = 0.6$ (1)

$\alpha = -0.7854$ (2)

$f_2/f = 1.58$ (3)

$n_n - n_P = 0.373$ (4)

$\nu d_1 = 57.5$ (5)

where in the Table given above, f is the focal length, $F_{NO}$ is the F-number, and $2\omega$ is the field angle, the numerals at the left end then represent the order from the object side, r is the radius of curvature of the lens surface, d is the space between the lens surfaces, the refractive index n and the Abbe number $\nu$ are values with respect to the d-line ($\lambda = 587.6$ nm), d0 is the distance from the object to the top of the closest-to-object lens, Bf is the back focus, $\beta$ is the magnification, $\alpha$ is the conversion inclination obtained by multiplying an angle between the paraxial marginal ray emerging from an on-axis infinity object point that is incident on the closest-to-object lens surface of said second lens group and the optical axis by the refractive index of a medium just before said surface, $f_2$ is the synthetic focal length of said second lens group, $n_P$ is the refractive index, with resect to the d-line, of said positive lens constituting a part of said closest-to-image cemented lens of said second lens group, $n_n$ is the refractive index, with respect to the d-line, of said negative lens constituting a part of said closes-to-image cemented lens of said second lens group, and $\nu d_1$ is the Abbe number of said negative meniscus lens positioned closest to the object.

16. The fisheye lens according to claim 1, wherein said lens is constructed in accordance with the following data:

| | f = 15.4<br>2ω = 180°<br>$F_{NO}$ = 2.87 | | | |
|---|---|---|---|---|
| | r | d | ν | n |
| 1 | 69.933 | 1.96 | 57.5 | 1.67025 |
| 2 | 12.013 | 8.00 | | |
| 3 | 58.325 | 2.95 | 25.5 | 1.73038 |
| 4 | 312.507 | 0.96 | | |
| 5 | 216.905 | 1.96 | 60.0 | 1.64000 |
| 6 | 17.063 | (d6) | | |
| 7 | 63.606 | 9.71 | 28.3 | 1.72825 |
| 8 | −166.033 | 2.94 | | |
| 9 | 0.000 | 1.80 | 64.2 | 1.51680 |
| 10 | 0.000 | 0.78 | | |
| 11 | 20.159 | 3.90 | 65.8 | 1.46450 |
| 12 | 21.871 | 1.65 | | |
| 13 | −75.031 | 2.80 | 65.8 | 1.46450 |
| 14 | −17.884 | 0.05 | | |
| 15 | 41.834 | 7.36 | 70.5 | 1.48749 |
| 16 | −13.257 | 1.00 | 23.0 | 1.86074 |
| 17 | −22.051 | (Bf) | | |

(Variable space during infinity focusing and short distance focusing when $\beta = 1/30$)

| f | 15.4091 |
|---|---|
| D0 | ∞ |
| d6 | 5.0214 |
| Bf | 38.0008 |
| β | −0.0333 |
| D0 | 444.7335 |
| d6 | 5.3444 |
| Bf | 38.0008 |

Note that the condition corresponding values in the embodiments discussed above are shown as below.

$X_2/X_1 = 0$ (1)

$\alpha = -1.2610$ (2)

$f_2/f = 1.41$ (3)

$n_n - n_P = 0.373$ (4)

$\nu d_1 = 57.5$ where in the Table given above, f is the focal length, $F_{NO}$ is the F-number, and $2\omega$ is the field angle, the numerals at the left end then represent the order from the object side, r is the radius of curvature of the lens surface, d is the space between the lens surfaces, the refractive index n and the Abbe number $\nu$ are values with respect to the d-line ($\lambda = 587.6$ nm), d0 is the distance from the object to the top of the closest-to-object lens, Bf is the back focus, $\beta$ is the magnification, $\alpha$ is the conversion inclination obtained by multiplying an angle between the paraxial marginal ray emerging from an on-axis infinity object point that is incident on the closest-to-object lens surface of said second lens group and the optical axis by the refractive index of a medium just before said surface, $f_2$ is the synthetic focal length of said second lens group, $n_P$ is the refractive index, with respect to the d-line, of said positive lens constituting a part of said closest-to-image cemented lens of said second lens group, $n_n$ is the refractive index, with respect to the d-line, of said negative lens constituting a part of said closest-to-image cemented lens of said second lens group, and $\nu d_1$ is the Abbe number of said negative meniscus lens positioned closest to the object.

17. The fisheye lens according to claim 1, wherein said lens is constructed in accordance with the following data:

| | f = 15.4<br>2ω = 180°<br>$F_{NO}$ = 2.86 | | | |
|---|---|---|---|---|
| | r | d | ν | n |
| 1 | 66.028 | 1.96 | 57.5 | 1.67025 |
| 2 | 12.061 | 8.00 | | |
| 3 | 59.825 | 2.95 | 25.5 | 1.73038 |
| 4 | 223.777 | 0.98 | | |
| 5 | 223.777 | 1.96 | 60.0 | 1.64000 |
| 6 | 17.224 | 4.90 | | |
| 7 | 62.981 | 9.80 | 28.3 | 1.72825 |
| 8 | −171.273 | 2.94 | | |
| 9 | 0.000 | 1.80 | 64.2 | 1.51680 |
| 10 | 0.000 | 0.78 | | |
| 11 | 20.191 | 3.90 | 65.8 | 1.46450 |
| 12 | 21.788 | 1.65 | | |
| 13 | −76.172 | 2.80 | 65.8 | 1.46450 |
| 14 | −17.891 | (d14) | | |
| 15 | 42.043 | 7.36 | 70.4 | 1.48749 |
| 16 | −13.281 | 1.00 | 23.0 | 1.86074 |
| 17 | −21.946 | (Bf) | | |

(Variable space during infinity focusing and short distance focusing when $\beta = 1/30$)

| f | 15.4091 |
|---|---|
| D0 | ∞ |
| d14 | 0.0500 |
| Bf | 37.9996 |
| β | −0.0333 |
| D0 | 453.6264 |

| | -continued | |
|---|---|---|
| d14 | 0.3253 | |
| Bf | 38.5108 | |

Note that the condition corresponding values in the embodiments discussed above are shown as below:

$X_2/X_1 = 0.65$ (1)

$\alpha = 0.0999$ (2)

$f_2/f = 2.9$ (3)

$n_n - n_P = 0.373$ (4)

$\nu d_1 = 57.5$ (5)

where in the Table given above, f is the focal length, $F_{NO}$ is the F-number, and $2\omega$ is the field angle, the numerals at the left end then represent the order from the object side, r is the radius of curvature of the lens surface, d is the space between the lens surfaces, the refractive index n and the Abbe number $\nu$ are values with respect to the d-line ($\lambda = 587.6$ nm), d0 is the distance from the object to the top of the closest-to-object lens, Bf is the back focus, $\beta$ is the magnification, $\alpha$ is the conversion inclination obtained by multiplying an angle between the paraxial marginal ray emerging from an on-axis infinity object point that is incident on the closest-to-object lens surface of said second lens group and the optical axis by the refractive index of a medium just before said surface, $f_2$ is the synthetic focal length of said second lens group, $n_P$ is the refractive index, with resect to the d-line, of said positive lens constituting a part of said closest-to-image cemented lens of said second lens group, $n_n$ is the refractive index, with respect to the d-line, of said negative lens constituting a part of said closest-to-image cemented lens of said second lens group, and $\nu d_1$ is the Abbe number of said negative meniscus lens positioned closest to the object.

18. The fisheye lens according to claim 1, wherein said lens is constructed in accordance with the following data:

| | f = 15.3 | | | |
|---|---|---|---|---|
| | $2\omega$ = 180° | | | |
| | $F_{NO}$ = 2.83 | | | |
| | r | d | $\nu$ | n |
| 1 | 73.110 | 2.47 | 55.5 | 1.69680 |
| 2 | 15.370 | 14.83 | | |
| 3 | 40.310 | 2.47 | 43.9 | 1.78590 |
| 4 | 13.520 | 5.27 | | |
| 5 | 24.210 | 3.51 | 26.6 | 1.76182 |
| 6 | −44.260 | 1.00 | | |
| 7 | −31.100 | 12.14 | 33.4 | 1.80610 |
| 8 | 1200.000 | (d8) | | |
| 9 | 174.000 | 6.42 | 70.4 | 1.48749 |
| 10 | −17.950 | 0.10 | | |
| 11 | 53.680 | 5.05 | 70.4 | 1.48749 |
| 12 | −14.000 | 1.00 | 25.5 | 1.80518 |
| 13 | −30.720 | (Bf) | | |

(Variable space during infinity focusing and short distance focusing when $\beta = 1/30$)

| f | 15.3008 |
|---|---|
| D0 | ∞ |
| d8 | 3.2700 |
| Bf | 38.9928 |

| | -continued |
|---|---|
| $\beta$ | −0.0333 |
| D0 | 443.8347 |
| d8 | 3.5129 |
| Bf | 39.3571 |

Note that the condition corresponding values in the embodiments discussed above are shown as below:

$X_2/X_1 = 0.6$ (91)

$\alpha = -0.7671$ (2)

$f_2/f = 1.58$ (3)

$n_n - n_P = 0.318$ (4)

$\nu d_1 = 55.5$ (5)

where in the Table given above, f is the focal length, $F_{NO}$ is the F-number, and $2\omega$ is the field angle, the numerals at the left end then represent the order from the object side, r is the radius of curvature of the lens surface, d is the space between the lens surfaces, the refractive index n and the Abbe number $\nu$ are values with respect to the d-line ($\lambda = 587.6$ nm), d0 is the distance from the object to the top of the closest-to-object lens, Bf is the back focus, $\beta$ is the magnification, $\alpha$ is the conversion inclination obtained by multiplying an angle between the paraxial marginal ray emerging from an on-axis infinity object point that is incident on the closest-to-object lens surface of said second lens group and the optical axis by the refractive index of a medium just before said surface, $f_2$ is the synthetic focal length of said second lens group, $n_P$ is the refractive index, with respect to the d-line, of said positive lens constituting a part of said closest-to-image cemented lens of said second lens group, $n_n$ is the refractive index, with respect to the d-line, of said negative lens constituting a part of said closest-to-image cemented lens of said second lens group, and $\nu d_1$ is the Abbe number of said negative meniscus lens positioned closest to the object.

19. A fisheye lens incorporating a short distance compensating function, comprising:
   a first lens group including at least one negative meniscus lens, positioned closest to an object, with its convex surface toward the object and at least one positive lens;
   a second lens group including a cemented positive lens consisting of a positive lens and a negative lens and disposed closer to an image than said first lens group to have positive refractive power on the whole,
   wherein when focusing from an infinity object point onto a short distance object point, said first and second lens groups are so constructed as to be relatively movable on the optical axis toward the object to expand an air space between said first and second lens groups.

20. The fisheye lens according to claim 19, wherein said first and second lens groups are constructed to satisfy the following condition:

$0 \leq X_2/X_1 \leq 0.9$ where $X_1$ is the moving quantity of said first lens group $G_1$ during focusing, and $X_2$ is the moving quantity of said second lens group $G_2$ during focusing.

21. The fisheye lens according to claim 19, wherein said first lens group is constructed so that a conversion inclination is set to satisfy the following condition:

$$-1.5 \leq \alpha \leq 1$$

where $\alpha$ is the conversion inclination obtained by multiplying an angle between the paraxial marginal ray emerging from an on-axis infinity object point that is incident on the closest-to-object lens surface of said second lens group and the optical axis by a refractive index of a medium just before said surface.

22. The fisheye lens according to claim 19, wherein said second lens group is constructed to further satisfy the following condition:

$$1 \leq f_2/f \leq 5$$

where
f: the focal length of the whole lens system, and
$f_2$: the focal length of said second lens group.

23. The fisheye lens group according to claim 19, wherein said first lens group is constructed to satisfy the following condition:

$$52 \leq \nu d_1$$

where $\nu d_1$ is the Abbe number of said negative meniscus lens positioned closest to the object in said first lens group.

24. The fisheye lens according to claim 19, wherein said second lens group includes a cemented positive lens positioned closest to the image and consisting of a positive lens and a negative lens, and said cemented positive lens is constructed to satisfy the following condition:

$$0.15 \leq n_P - n_n$$

where
$n_P$: the refractive index, with respect to the d-line, of said positive lens constituting a part of said closest-to-image cemented lens of said second lens group, and
$n_n$: the refractive index, with respect to the d-line, of said negative lens constituting a part of said closest-to-image cemented lens of said second lens group.

25. The fisheye lens according to claim 19, wherein said first and second lens groups are so constructed as to be relatively movable to further satisfy the following condition:

$$0 \leq X_2/X_1 \leq 0.8$$

where
$X_1$: the moving quantity of said first lens group during focusing, and
$X_2$: the moving quantity of said second lens group during focusing.

26. The fisheye lens according to claim 19, wherein said first lens group is constructed of, sequentially from the object, a first negative meniscus lens with its convex surface toward the object, a second negative meniscus lens with its convex surface toward the object and a cemented positive lens consisting of a biconvex positive lens and a negative meniscus lens, said second lens group is constructed of, sequentially from, a cemented lens consisting of a negative lens and a biconvex positive lens and a cemented lens consisting of a biconvex positive lens and a negative meniscus lens, an aperture stop is disposed between said first and second lens groups, and a filter is disposed closer to the image than said second lens group.

27. The fisheye lens according to claim 19, wherein said first lens group is constructed of, sequentially from the object, a first meniscus lens with its convex surface toward the object, a second negative meniscus lens with its convex surface toward the object, a cemented positive lens consisting of a biconvex positive lens and a negative meniscus lens, an aperture stop and a cemented positive lens consisting of a negative lens and a biconvex positive lens, said second lens group is constructed of a cemented positive lens consisting of a biconvex positive lens and a negative meniscus lens, and a filter is disposed closer to the image than said second lens group.

28. The fisheye lens according to claim 19, wherein said first lens group is constructed of, sequentially from the object, a first negative meniscus lens with its convex surface toward the object, a positive meniscus lens with its convex surface toward the object, a second negative meniscus lens with its convex surface toward the object and a biconvex positive lens, said second lens group is constructed of, sequentially from the object, a filter, a positive meniscus lens with its convex surface toward the object, a positive meniscus lens with its convex surface toward the image and a cemented positive lens consisting of a biconvex positive lens and a negative meniscus lens, and an aperture stop is disposed between said first lens group and said filter of said second lens group.

29. The fisheye lens according to claim 19, wherein said first lens group is constructed of, sequentially from the object, a first negative meniscus lens with its convex surface toward the object, a positive meniscus lens with its convex surface toward the object and a second negative meniscus lens with its convex surface toward the object, and second lens group is constructed of, sequentially from the object, a biconvex positive lens, an aperture stop, a filter, a positive meniscus lens with its convex surface toward the object, a positive meniscus lens with its convex surface toward the image and a cemented lens consisting of a biconvex positive lens and a negative meniscus lens.

30. The fisheye lens according to claim 19, wherein said first lens group is constructed of, sequentially from the object, a first negative meniscus lens with its convex surface toward the object, a positive meniscus lens with its convex surface toward the object, a second negative meniscus lens with its convex surface toward the object, a biconvex positive lens, an aperture stop, a filter, a positive meniscus lens with its convex surface toward the object and a positive meniscus lens with its convex surface toward the image, and said second lens group is constructed of only a cemented positive lens consisting of a biconvex positive lens and a negative meniscus lens.

31. The fisheye lens according to claim 19, wherein said first lens group is constructed of, sequentially from the object, a first negative meniscus lens with its convex surface toward the object, a second negative meniscus lens with its convex surface similarly toward the object, a biconvex positive lens and a negative lens with its closest-to-object concave surface toward the object, said second lens group is constructed of a positive lens with its convex surface having a larger curvature toward the image and a cemented positive lens consisting of a biconvex positive lens and a negative meniscus lens, and an aperture stop is disposed between said first and second lens groups.

* * * * *